United States Patent
Manroa et al.

(10) Patent No.: US 8,126,697 B1
(45) Date of Patent: Feb. 28, 2012

(54) SYSTEM AND METHOD FOR LANGUAGE CODING NEGOTIATION

(75) Inventors: Arun Manroa, Herndon, VA (US); Zheng Cai, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 967 days.

(21) Appl. No.: 11/870,299

(22) Filed: Oct. 10, 2007

(51) Int. Cl.
*G10L 15/00* (2006.01)

(52) U.S. Cl. ............ 704/2; 704/8; 704/235; 379/88.05

(58) Field of Classification Search .................. 704/2, 8, 704/235; 379/88.05
See application file for complete search history.

(56) References Cited

U.S. PATENT DOCUMENTS

| | | | |
|---|---|---|---|
| 2002/0010590 A1* | 1/2002 | Lee | 704/277 |
| 2002/0181669 A1* | 12/2002 | Takatori et al. | 379/88.06 |
| 2005/0034097 A1* | 2/2005 | Brealey et al. | 717/100 |
| 2005/0144012 A1* | 6/2005 | Afrashteh et al. | 704/277 |
| 2006/0034260 A1* | 2/2006 | Svedberg et al. | 370/352 |
| 2007/0043868 A1* | 2/2007 | Kumar et al. | 709/226 |
| 2009/0006076 A1* | 1/2009 | Jindal | 704/3 |

FOREIGN PATENT DOCUMENTS

KR 2004028178 A * 4/2004

* cited by examiner

*Primary Examiner* — Daniel D Abebe

(57) ABSTRACT

Systems and methods are provided for establishing a communication session between a first and second communication device. A request may be received for a communication session from the first communication device, the request indicating a language for media streams transmitted to, and received from, the first communication device. A communication session invitation specifying a plurality of languages supported for the communication session may be transmitted to the second communication device. A response may be received, from the second communication device, indicating a language for media streams transmitted to, and received from, the second communication device. The communication session, between the first and second communications devices may be established such that the media streams transmitted to, and received from, the first and second communications device are in a language indicated by the first and second communications devices respectively.

20 Claims, 6 Drawing Sheets

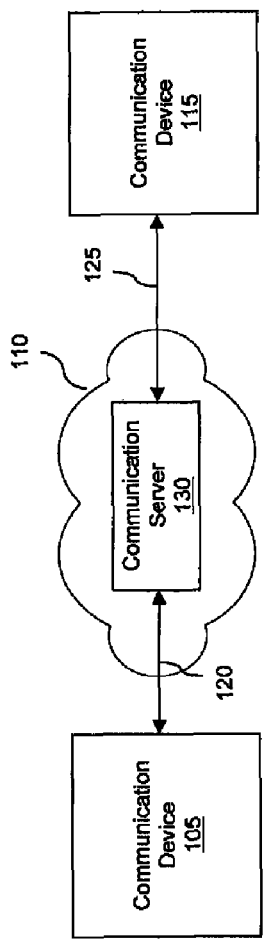
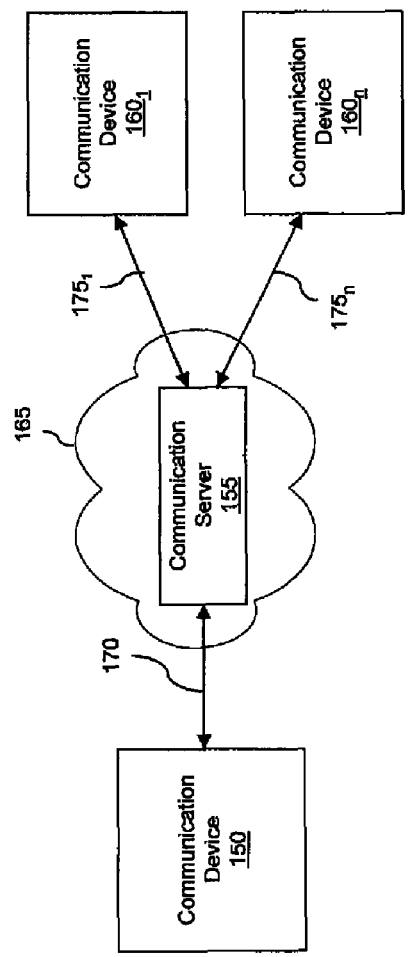

SYSTEM AND METHOD FOR LANGUAGE CODING NEGOTIATION

BACKGROUND OF THE INVENTION

In recent years the cost of communications has decreased, leading to an increase in calls between people located in different countries. The parties to a call, therefore, may speak different languages. Furthermore, even calls within countries may involve parties that speak different languages. Typical voice communication techniques assume that all parties to a call speak the same language, however, this assumption may no longer be valid.

SUMMARY OF THE INVENTION

It has been recognized that conventional voice communication techniques do not provide for a determination, before a communication session is established, whether a target user understands a different language. Additionally, conventional systems do not provide techniques for identifying languages that are supported, prior to establishing a communication session. Accordingly, there is a need in the art for a capability to offer multiple languages during setup of a communication session. This would be particularly useful for companies that have employees spread out across different countries, speaking many different languages. It would also be useful for communication group calls. Specifically, a communication group is composed of members that have some relationship. For example, a communication group may include a number of employees of a company working on a particular project. One employee may be interested in communicating only with those members who speak a particular language. The techniques disclosed herein allow establishment of such communication sessions.

Conventional media negotiation methods focus on the need to select a common media codec (i.e., Audio and/or Video Codec). Once selected, the common codec may be used to encode raw media, such as audio and/or video data, based in part on the common codec for transmission. Similarly, the common codec may be used to decode received media. Conventional Push-to-Talk session setup methods such as the Open Mobile Alliance (OMA) Push-to-Talk over Cellular (POC) standard use standards based protocols (i.e., SIP/SDP). Further, proprietary systems including iDen® and Qchat® do not support human language negotiation.

Disclosed and claimed herein are systems and methods for establishing a communication session between first and second communication devices. In accordance with exemplary embodiments of the present invention, a communication server can receive a request for a communication session from the first communication device, the request indicating a language for media streams transmitted to, and received from, the first communications device. The communication server can then transmit a communication session invitation to the second communication device, wherein the invitation specifies a plurality of languages supported for the communication session. A response can be received, from the second communication device by the communication server, indicating a language for media streams transmitted to, and received from, the second communication device. The communication session between the first and second communications devices is established, wherein the media streams transmitted to, and received from, the first communication device are in a language indicated by the first communication device, and the media streams transmitted to and received from the second communication device are in the language indicated by the second communication device. The communication server can be a translation server that translates communications between the first and second communication devices. In another embodiment, the communication server can invoke an external translation system. Alternatively, or additionally, one or both of the first and second communication devices can include a translation device. In this case, the language negotiation between the communication devices can be based on the languages supported by the translation device in one or both of the communication devices.

Other objects, advantages and novel features of the present invention will become apparent from the following detailed description of the invention when considered in conjunction with the accompanying drawings.

BRIEF DESCRIPTION OF THE DRAWING FIGURES

FIGS. 1a and 1b are simplified block diagrams of a systems in accordance with the present invention;

DETAILED DESCRIPTION OF THE PREFERRED EMBODIMENTS

Figure 2A:
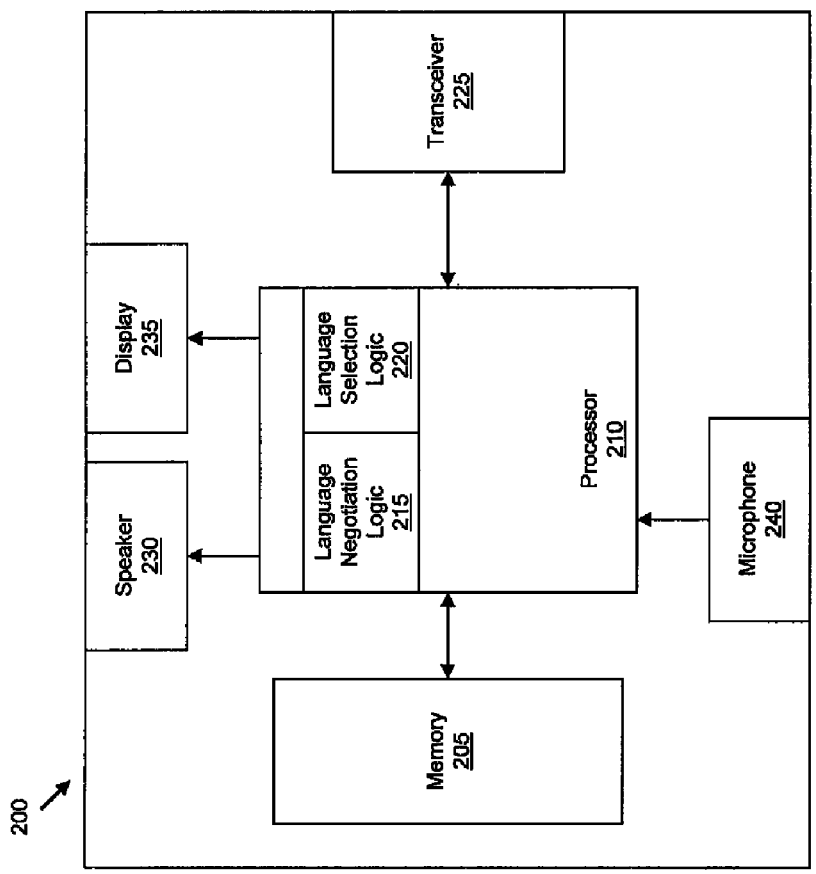
FIGS. 2a and 2b are block diagrams of an exemplary communication device in accordance with the present invention.

Referring now to the figures, FIG. 1a is a simplified system diagram of an exemplary communication system in accordance with the present invention. As illustrated, communication network 110 may include a communication server 130 to support a communication session between communication device 105 and communication device 115, over communication links 120 and 125, respectively. Communication devices 105 and 115 can be any type of wireless and/or wired communication device, supporting any type of communications, such as voice dispatch, voice interconnect, text, video and/or the like. As such, media streams of a communication session between communication devices 105 and 115 may be carried over communication links 120 and 125. It should be appreciated that media streams may be based on any wired and/or wireless based standard (e.g., Pulse Code Modulation (PCM), Global System for Mobile Communications (GSM), Code Division Multiple Access (CDMA), etc.). Similarly, communications supported by communication network 110 may be either wireless, wireline or a combination thereof. The media streams may be one or more of voice, text, video and communication data in general.

A communication session may be provided between communication devices 105 and 115 in at least one of a plurality of languages (e.g., English, Spanish, French, etc.). The communication session can be performed with or without translation between different languages. In one exemplary embodiment, communication devices 105 and 115 may each indicate a language for media streams transmitted to, and received from, each device. As such, media streams from, or to, each communication device may be translated into a desired language. Establishing the communication session is described below in more detail with reference to FIGS. 3 and 4.

When the communication session is performed with translation, the translation can be performed within communication network 110 and/or by a translation device in one or more of the communication devices. Specifically, it may be appreciated that a communication device (e.g., communication device 105) may be configured to perform translation of media streams from a language associated with the communication device to a language desired by a target communication device (e.g. communications device 115). It may further be appreciated that communication server 130, or a network device coupled to the communication server, may be configured to perform translation of media streams. For example, media streams received from and transmitted to the first communication device may include voice, media streams received from the second communication device may include voice, and the media stream transmitted to the second communications device may be text. As may be appreciated, at least one of a request and response may indicate that speech-to-text translation is desired. As used herein, conversion of media from a first format in a first language to a second format in a second language may be referred as media transponding. Accordingly, communication network 110 may support media transponding as described below in more detail with respect to FIGS. 3 and 4.

While in certain embodiments, media streams may be translated from a first voice language to a second voice language. It should equally be appreciated that media streams may be translated from voice in a first language to text in a second language. Similarly, a translated media stream may be configured to provide at least one of voice and text, and video and text, wherein the text may correspond to translated voice data.

As illustrated in FIG. 1b, the present invention can also be implemented for a communication session between a first communication device 150 and a plurality of communication devices $160_1$-$160_n$. Communication devices 150 and $160_1$-$160n$ can be any type of wireless and/or wired communication device, supporting any type of communications, such as voice dispatch, voice interconnect, text, video and/or the like. In one embodiment, the communication session may be supported by communication network 165 over communication link 170 and at least one of communication links $175_1$ to $175_n$. To that end, communication network 165 may be configured to support a group communication session between communication devices 150 and $160_1$-$160_n$. with a single language. Communication network 165 may also be configured to support a plurality of languages for a communication session between communication devices 150 and $160_1$-$160_n$. It may be appreciated that communication network 165 includes a communication server 155 configured to support such sessions.

It is recognized that there may be different language requirements for different communications links (e.g. communications links $175_1$-$175_n$) of a communication session. Accordingly, as illustrated in FIG. 1b, the present invention can provide media streams in a specified language for each communication link (e.g. communications links $175_1$-$175_n$). For example, if communication device 150 employs a translation device and is employed by a user that speaks a specified language, and a second communication device $160_1$ does not include a translation device and the user speaks a language other than the specified language, then a media stream in a language specified by second communication device $160_1$ is desirable. The communication devices may be used to dynamically negotiate a set of languages supported by one of a communication devices (e.g., communication device 150) and communication server 155. In that fashion, a media stream received from the first communication device may be converted from the language indicated by the first communication device into a language indicated by a second communication device. Moreover, multiple languages may be offered to negotiate and establish a communication session.

Referring now to FIG. 2a, a block diagram of an exemplary communication device 200 is shown in accordance with the present invention. As shown, communication device 200 includes a processor 210 coupled to memory 205 and transceiver 225. Processor 210 includes language negotiation logic 215 and language selection logic 220, and can be any type of processor, such as a microprocessor, field programmable gate array (FPGA) and/or application specific integrated circuit (ASIC). When processor 210 is a microprocessor then logic 215 and 220 can be processor-executable code loaded from memory 205. As such, communication device 200 may be configured to operate with the communications network as described in FIGS. 1a-1b. In one embodiment, communication device 200 may be configured to negotiate a common language for a communication session with one or more target communication devices.

In one exemplary embodiment, communication device 200 may initiate, and/or receive, communication requests to, or from, a target communication device (e.g, communication device 115). The request for communication may be issued by language selection logic 220, to provide a desired language for communication device 200. Similarly, language selection logic 220 may be configured to provide a list of languages supported by communication device 200 prior to establishing a communication session. Additionally, the list of languages may be specified by a user of communication device 200. It may further be appreciated that communication device 200 interoperates with a communication server (e.g., communication server 130 or 155) for negotiation of a communication language. As such, language negotiation logic 215 can establish a communication session using languages indicated by requests for communication. Language negotiation logic 215 may also interoperate with the communication server to receive media streams in a language supported by the communication device. To that end, language negotiation logic 215 can negotiate between languages supported by the communication server and target communication devices.

In a further embodiment of the invention, processor 210 may utilize a plurality of codecs to support media streams of a communication session. As may be appreciated, communication device 200 may be configured to support at least one of enhanced variable rate codec (EVRC), G.711, adaptive multi-rate compression (AMR) codec and/or any other type of voice codec. Moreover, the voice codecs may be integrated into processor 210 or may all be provided on a separate processor.

Figure 2B:
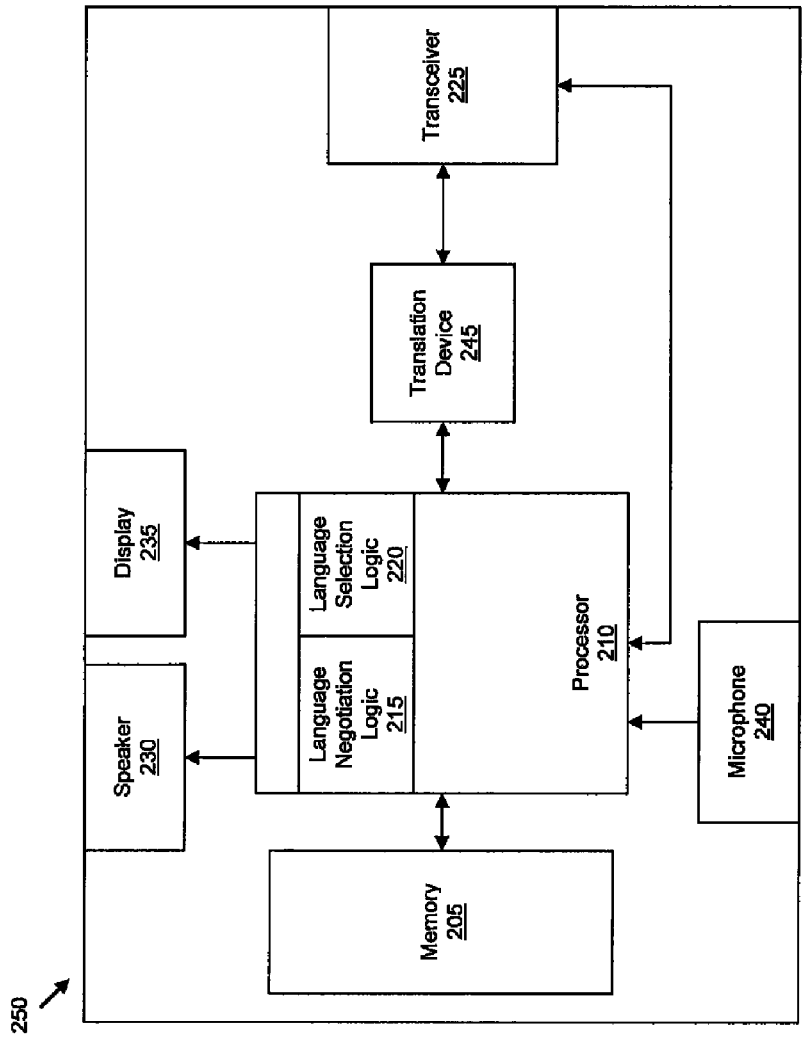

Referring now to FIG. 2b, a block diagram is shown of a communication device 250 in accordance with certain embodiments of the present invention. Communication device 250 includes a processor 210 coupled to memory 205, transceiver 225, speaker 230, display 235 and microphone 240, as described above with reference to FIG. 2a. Further, communication device 250 includes translation device 245 coupled to processor 210 and transceiver 225. Translation device 245 can convert a media stream transmitted to, and received from, a target communication device from a language indicated by the first communication device into a language indicated by a second communication device. In that fashion, communication device 250 may support a communication session based on the languages supported by the translation device 245 in one or both of the communication devices. For example, media streams received from and transmitted to the communication device 250 may include voice, media streams received from a second communication device may include voice and the media stream transmitted to the second communications device may be text. It should equally be appreciated that translation device 245 can translate media streams from voice in a first language to text in a second language. Similarly, translation device 245 can translate media streams to provide at least one of voice and text, and video and text, wherein the text may correspond to translated voice data.

Figure 2C:
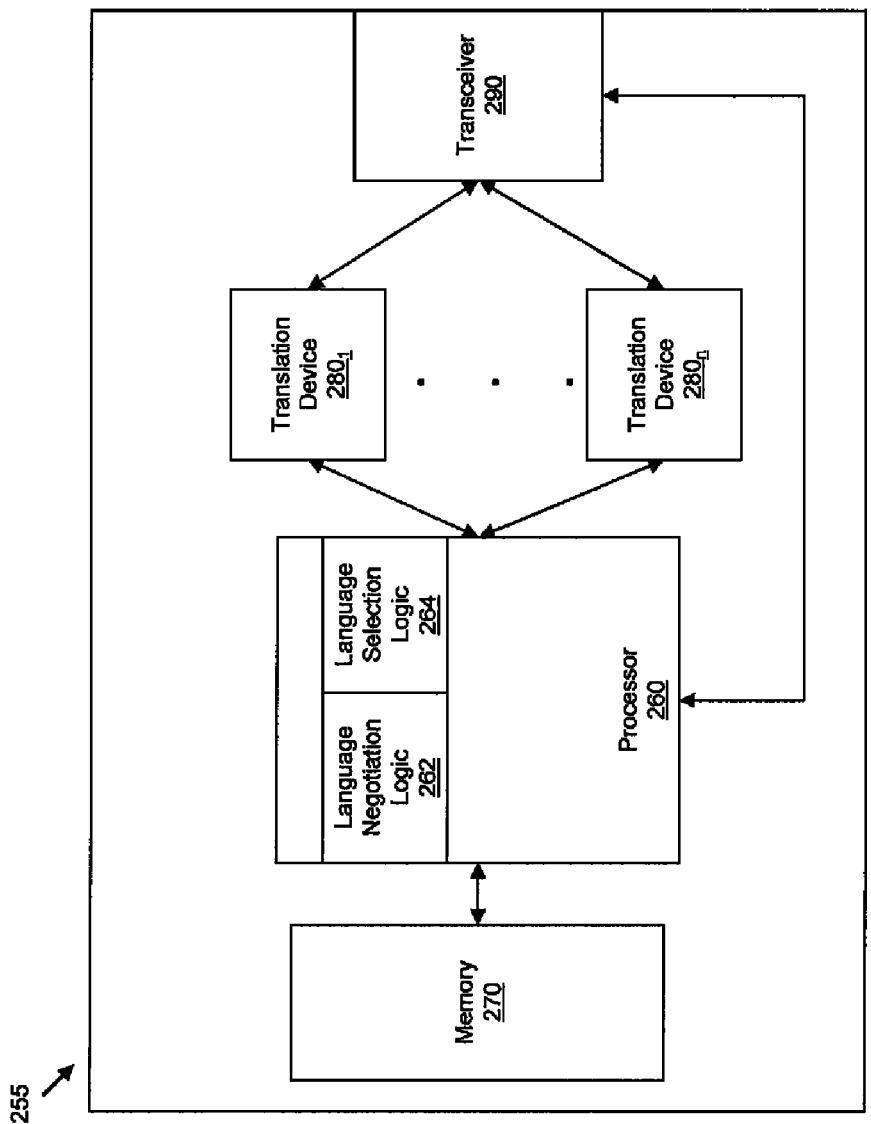
FIG. 2c is a block diagram of an exemplary communication server in accordance with the present invention.

FIG. 2c illustrates an exemplary communication server 255 in accordance with the present invention. Communication server 255 includes processor 260 coupled to memory 270, one or more translation devices $280_1$-$280_n$, and transceiver 290. When communication server 255 performs translations for one of the communication devices, one or more of translation devices $280_1$-$280_n$ are employed, and when the communication server does not perform translations, processor 260 communicates directly with transceiver 290. Processor 260 includes logic 262 and 264, which will be described in more detail below in connection with FIG. 3. Processor 260 can be any type of processor, such as a microprocessor, field programmable gate array (FPGA) and/or an application specific integrated circuit (ASIC). When processor 260 is a microprocessor then logic 262 and 264 can be processor-executable code loaded from memory 270.

Figure 3:
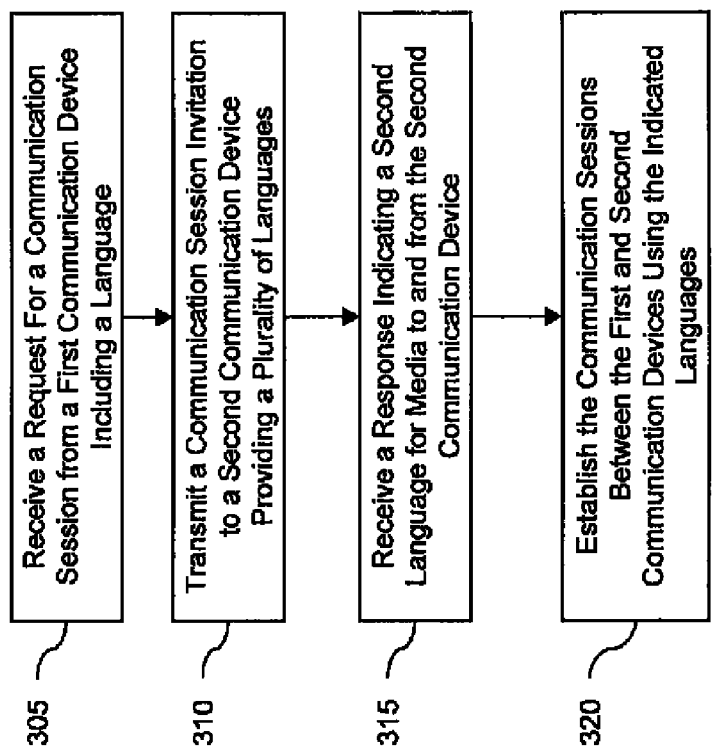
FIG. 3 is a flow diagram of an exemplary method in accordance with the present invention.

FIG. 3 is a flow diagram of an exemplary method of establishing a communication session, in accordance with the present invention. Language negotiation logic 262 of communication server (e.g., communication server 130 or 155) receives a request for a communication session from a first communication device, via transceiver 290, indicating a language for media streams transmitted to, and received from, the first communication device (step 305). The request may include a list of languages supported for a communication session. Further, the request may be provided as a Session Initiation Protocol (SIP) Invite message, wherein a specified language or list of languages may be indicated in a session description protocol portion (sdp) of the SIP Invite message for systems which employ these protocols. Similarly, languages may be indicated by initial call setup messages to enable dynamic language negotiation. For example, a call setup message as provided by an iDen® or Qchat® system may be utilized to indicate one or more languages to establish a communication session according to one or more embodiments of the invention.

Language negotiation logic 262 processes the request and transmits a communication session invitation to a second communication device (step 310). The communication session invitation may be transmitted to a plurality of communication devices for a group communication session. Additionally, the communication session invitation may provide a list of languages supported for the communication session. The communication session invitation can be transmitted in, for example, a session description protocol (sdp) portion of a Session Initiation Protocol (SIP) Invite message for systems which employ these protocols. Similarly, languages may be indicated by initial call setup messages to enable dynamic language negotiation. For example, a call setup message as provided by an iDen® or Qchat® system may be utilized to indicate one or more languages to establish a communication session according to one or more embodiments of the invention.

Language negotiation logic 262 of the communication sever receives a response to the communication session invitation from a second communication device (step 315). When the response indicates an acceptance of a language provided by the invitation, then language selection logic establishes a communication session may be established between the first and second communication devices (step 320). In one embodiment, the response can be in a session description protocol (sdp) portion of a 200 OK message for systems which employ these protocols. Similarly, languages may be indicated by response messages, corresponding to call setup messages, to enable dynamic language negotiation. For example, a response message as provided by an iDen® or Qchat® system may be utilized to indicate one or more languages to establish a communication session according to one or more embodiments of the invention.

When the response indicates that more than one of the languages are acceptable, then the communication server selects the language for the first and second languages based on those that are indicated as acceptable in the response. The acceptance can be explicit, such as a confirmation message sent to the other communication device, or implicit, such as by beginning the communication session using one of the indicated languages. When the first and second languages of the response are not acceptable, then communication server continues negotiation with either or both of the first and second communication devices until an acceptable language can be agreed-upon. This negotiation can involve one or more messages. For example, the communication server can send a message indicating a different a set of languages supported by the communication session, and the second communication device can accept these languages, or respond with different language message. Similar message exchanges can be performed with the first communication device.

In certain embodiments, if a communication session language can not be agreed upon, the communication invitation may be forwarded to a communication device configured to operate with at least one of the indicated languages. It may be appreciated that, such a communication unit may be assigned by the communication network. For example, a communication group may include a number of members that each speaks different languages. If the communication session with one member of the group cannot be established because a language cannot be agreed upon, then another member of the group may be selected for the communication session, where the another member is capable of speaking one of the selected languages.

Although FIG. 3 has been described in connection with plurality of languages being exchanged between the communication devices as part of the language negotiation, the communication server can exchange just one language for each direction, or one language for one direction and a set of languages for the other direction.

The language negotiation described above can be performed in addition any codec negotiation, such as that described in U.S. patent application Ser. No. 11/741,043, entitled "System and Method for Voice Coding Negotiation", filed Apr. 27, 2007, the entire contents of which is herein expressly incorporated by reference. Specifically, the same message can carry both a language and codec selection.

Figure 4:
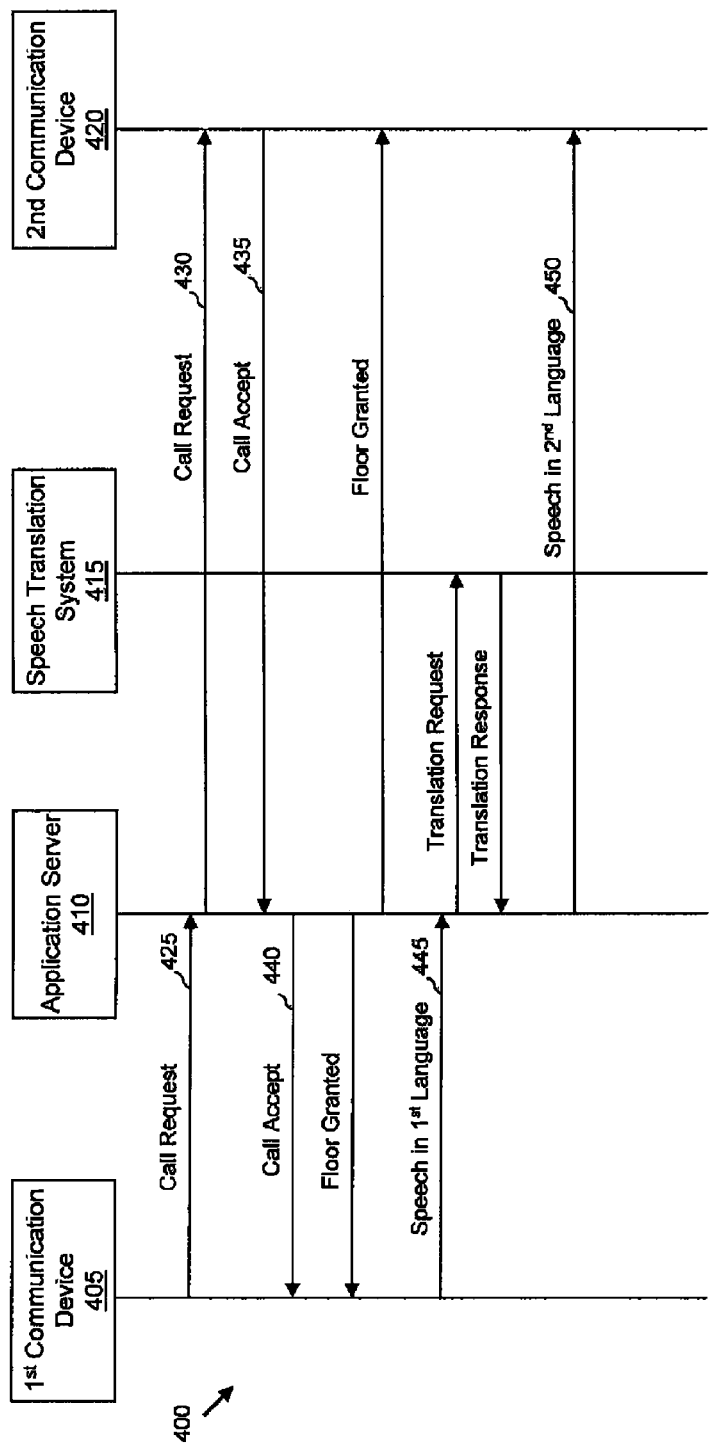
FIG. 4 is a call flow diagram of an exemplary method in accordance with the present invention.

FIG. 4 illustrates call setup procedure 400 of an exemplary method of establishing a communication session in accordance with the present invention. A first communication device 405 (e.g., communication device 105 or 150) transmits a call request message 425 for communication with a second communication device 420 (e.g., communication device 115 or $160_{1-n}$). Call request message 425 may indicate a preferred language for media streams transmitted to, and received from, first communication device 405. As may be appreciated, call request message 425 may correspond to a call setup message as provided by an iDen® or Qchat® system. Application sever 410 (e.g., communication server 130) can receive call setup request 425, process the request and transmit a call request message 430 to a second communication device 420.

Call request message 430 may provide a list of languages supported for the communication session. For example, call request message 430 may indicate that English, French, Deutsch and Spanish may be supported for the communication session. It may be appreciated that other human languages may be offered by call request message 430. Further, call request message 430 may correspond to a call response message as provided by an iDen® or Qchat® system. Communication device 420 may accept call request message 430 and transmit a call accept message 435 indicating a preferred language to application server 410.

Application server 410 transmits a call accept message 440 to communication device 405 indicating that call request 425 has been accepted by the second communications device 420. Call accept message 440 may further confirm the language indicated for media streams transmitted to, and received from, first communication device 405 in accordance with call request message 425.

Following acceptance of a call request, application server 410 can then grant floor control to first communications device 405 and second communications device 420. The first communications device 405 may then transmit media message 445 in a first language, such as speech in the first language, to application server 410. Application server 410 transmits media message 445 in the first language to speech translation system 415, which can translate the media into the language of the second communication device 420. Accordingly, speech translation system 415 performs the media transponding described above.

Although FIG. 4 illustrates speech translation system 415 as external to application server 415, speech translation system 415 may be integrated with communications device 405 (e.g., communications device 250) as described above in reference to FIG. 2b. Similarly, speech translation system 415 may be integrated with applications server 410 (e.g., communication server 255) as described above in reference to FIG. 2c. To that end, speech translation system 415 may provide media transponding for media received from first communication device 405 and second communication device 420.

Application server 415 transmits a translation of media message 445, as provided by speech translation system 415, to the second communications device 420 in media message 450. Following transmission of a translated media message from first communications device 405 to second communications device 420, media messages transmitted by second communications device 420 may be transponded in a similar matter as described above. Although call setup procedure 400 has been described in accordance with a Push-to-talk communication session, it may be appreciated that call setup procedure 400 may be applied to one of a Voice Over Internet Protocol (VoIP) communications and voice communications systems in general.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a communication session between a first and second communication device, the method comprising:
 receiving, at an application server, a request for a communication session from the first communication device, the request comprising a first plurality of languages for media streams transmitted to, and received from, the first communications device;
 transmitting, by the application server, a communication session invitation to the second communication device, wherein the invitation specifies a second plurality of languages supported for the communication session;
 receiving, at the application server, a response from the second communication device comprising a third plurality of languages for media streams transmitted to, and received from, the second communication device;
 selecting, by the application server, a first language from the first plurality of languages for media streams transmitted to, and received from, the first communications device and a second language from the second plurality of languages for media streams transmitted to, and received from, the second communications device; and
 establishing the communication session between the first and second communication device, wherein the media streams transmitted to, and received from, the first communication device are in the first language, and the media streams transmitted to, and received from, the second communications device are in the second language.

2. The method of claim 1, further comprising converting the media stream received from the first communication device from the first language into the second language.

3. The method of claim 1, wherein the request received from the first communication device comprises a push-to-talk protocol message.

4. The method of claim 1, wherein the request received from the first communication device comprises a Session Initiation Protocol (SIP) Invite message.

5. The method of claim 4, wherein the first plurality of languages indicated by the first communication device is indicated in a session description protocol portion of the SIP Invite message.

6. The method of claim 1, wherein the media streams include at least one of voice, video, and text.

7. The method of claim 6, wherein the media streams transmitted to, and received from, the first communication device comprise voice, the media streams received from the second communication device comprise voice, and the media streams transmitted to the second communications device comprise text.

8. The method of claim 1, wherein the request and response further comprise an indication that speech-to-text translation is desired.

9. The method of claim 1, wherein the first plurality of languages and the second plurality of languages are not identical.

10. The method of claim 1, wherein the third plurality of languages is a subset of the second plurality of languages.

11. The method of claim 1, further comprising:
 transmitting, by the application server, a communication session invitation to a third communication device, wherein the invitation specifies the second plurality of languages supported for the communication session, when the third plurality of languages does not include a language of the second plurality of languages.

12. A communication server, comprising:
 language negotiation logic configured to:
 receive a request for a communication session from a first communication device, the request comprising a first plurality of languages for media streams transmitted to, and received from, the first communications device;

transmit a communication session invitation to a second communication device, wherein the invitation specifies a second plurality of languages supported for the communication session;

receive a response, from the second communication device, indicating a third plurality of languages for media streams transmitted to, and received from, the second communication device; and language selection logic that selects a first language from the first plurality of languages for media streams transmitted to, and received from, the first communications device, selects a second language from the second plurality of languages for media streams transmitted to, and received from, the second communications device, and establishes the communication session between the first and second communication device, wherein the media streams transmitted to, and received from, the first communication device are in the first language, and the media streams transmitted to and received from the second communications device are in the second language.

13. The communication server of claim 12, further comprising a translation device that converts the media stream received from the first communication device from the first language into the second language.

14. The communication server of claim 12, wherein the request received from the first communication device comprises a push-to-talk protocol message.

15. The communication server of claim 12, wherein the request received from the first communication device comprises a Session Initiation Protocol (SIP) Invite message.

16. The communication server of claim 15, wherein the first plurality of languages indicated by the first communications device is indicated in a session description protocol portion of the SIP Invite message.

17. The communication server of claim 12, wherein the media streams include at least one of voice, video, and text.

18. The communication server of claim 12, wherein the first plurality of languages and the second plurality of languages are not identical.

19. The communication server of claim 12, wherein the third plurality of languages is a subset of the second plurality of languages.

20. The communication server of claim 12, wherein the language negotiation logic is further configured to:

transmit a communication session invitation to a third communication device, wherein the invitation specifies the second plurality of languages supported for the communication session, when the third plurality of languages does not include a language of the second plurality of languages.

\* \* \* \* \*